United States Patent
Kumagai et al.

(10) Patent No.: US 6,735,665 B1
(45) Date of Patent: May 11, 2004

(54) DATA PROCESSING DEVICE FOR SPECIFYING DATA STORAGE INFORMATION ON A PORTABLE RECORDING MEDIUM

(75) Inventors: Makoto Kumagai, Toyokawa (JP); Kazunori Shionoya, Toyohashi (JP); Atsushi Ishikawa, Anjo (JP); Hidekazu Takahama, Nagoya (JP); Takahiro Kitayama, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 324 days.

(21) Appl. No.: 09/612,911

(22) Filed: Jul. 10, 2000

(30) Foreign Application Priority Data

Jul. 19, 1999 (JP) ............................................ 11-205082

(51) Int. Cl.[7] ............................................... G06F 12/00
(52) U.S. Cl. ........................ 711/101; 711/115; 711/163; 711/164
(58) Field of Search ................................ 711/101, 115, 711/163, 164

(56) References Cited

U.S. PATENT DOCUMENTS

| | | | |
|---|---|---|---|
| 5,218,406 A | * | 6/1993 | Ebner ............................ 399/11 |
| 6,111,659 A | * | 8/2000 | Murata .......................... 358/296 |
| 6,362,893 B1 | * | 3/2002 | Francis et al. ............... 358/1.14 |
| 6,378,070 B1 | * | 4/2002 | Chan et al. ................... 713/155 |

FOREIGN PATENT DOCUMENTS

| | | | |
|---|---|---|---|
| JP | 08016605 | 1/1996 | ............ G06F/17/30 |
| JP | 09247307 | 9/1997 | ............ H04N/1/00 |
| JP | 09261486 | 10/1997 | ............ H04N/1/44 |

* cited by examiner

Primary Examiner—Matthew Kim
Assistant Examiner—Stephen Elmore
(74) Attorney, Agent, or Firm—Burns, Doane, Swecker & Mathis, L.L.P.

(57) ABSTRACT

A data processing device connected to a network and an external memory device stores data in a memory area of the external memory device. Image data and the like are transferred and stored in the memory area of an external memory device, and the data name and storage destination of the stored data are recorded on a portable memory medium. This portable memory medium can be used to simply and easily manage the data location and the like at any time. Since the data name and storage destination are recorded in the portable memory medium, there is less concern that the data name and storage destination will become known to users other than the user possessing the portable memory medium, thus ensuring data security compared to when such data are stored in the data processing device. Moreover, because there is no need to store the data name and storage destination in the data processing device, the complex controls required for displaying the stored data names and the like on the display panel are unnecessary.

22 Claims, 4 Drawing Sheets

DATA PROCESSING DEVICE FOR SPECIFYING DATA STORAGE INFORMATION ON A PORTABLE RECORDING MEDIUM

BACKGROUND OF THE INVENTION

1. Field of the Invention

The present invention relates to a data processing device applicable to a digital copier, or the like, that is connected to a network and an external memory device.

2. Description of the Related Art

There are known systems for storing image data and the like in an external memory device by a copier connected to a network and the external memory device. In this case, the data name (file name) of the stored data and the memory address in the external memory device, i.e., the storage destination of the data, must be managed beforehand. However, the data name may be readily misunderstood and the ability to recall it is dependent on the memory of the user, such that a data search may be difficult at the necessary time. For this reason, the name of stored data and the storage destination are stored in the copier, and displayed on the copier operation panel.

3. Problems Resolved by the Present Invention

In methods wherein data names and storage priorities are stored in a copier, and the data names and storage priorities are displayed on the operation panel of a copier which has limited space, when numerous files are stored in an external memory device, there is an increase in the amount of display of the corresponding data names as well as the amount of memory for the storage priorities. As a result, the control software for the display operation becomes increasing complex. Moreover, when data names and storage priorities are entered using a ten-key pad and the like, the operation of entering such information requires a long time, input errors readily occur, and such a method simply is not practical.

On the other hand, Japanese Laid-Open Patent Application No. HEI 9-261486 discloses a method of transferring data to a storage destination memory device in accordance with the storage destination information of data recorded on a memory card. Japanese Laid-Open Patent Application No. HEI 9-247307 discloses a method of restricting the operation content of a copier via information recorded on a memory card and a secret code or the like. Japanese Laid-Open Patent Application No. HEI 8-16605 discloses a method of reading data names and storage priorities recorded in a search sheet, and outputting the corresponding data.

The methods described in these publications, however, do not provide a means for managing data names and storage priorities in a simple manner after data have been stored in an external memory device.

Furthermore, when data names and storage priorities are all stored in a copier or scanner or the like, users readily have access to the data of other users, which poses a disadvantage from a security standpoint.

In view of the aforesaid information, the present invention provides a device capable of easily managing data names and storage priorities after data have been stored in an external memory device. Another object of the present invention is also to provide a data processing device capable of easily accessing data based on the data names and storage priorities. Yet another object of the present invention is to provide a device which does not allow access to one's own data by another user.

SUMMARY OF THE INVENTION

The aforesaid disadvantages are eliminated by one aspect of the present invention which provides a data processing device connected to a network and an external memory device, and provided with a storage means for storing data in a memory area of the external memory device; and a data information recording means for storing on the portable memory medium the storage destination and data name in the memory area of data stored by the storage means.

According to this data processing device, image data and the like are transferred and stored in the memory area of an external memory device by a storage means, and the data name and storage destination of the stored data are recorded on a portable memory medium by a recording means. Accordingly, this portable memory medium can be used to simply and easily manage the data location and the like at any time. Since the data name and storage destination are recorded in the portable memory medium, there is less concern that the data name and storage destination will become known to users other than the user possessing the portable memory medium, thus ensuring data security compared to when such data are stored in the data processing device. Moreover, because there is no need to store the data name and storage destination in the data processing device, the complex controls required for displaying the stored data names and the like on the display panel are unnecessary.

Another benefit of the invention resides in the fact that the user is not limited to retrieving the data at a single data processing device. Rather, if multiple data processing devices are connected to a network, the portable memory medium can be used with any one of them to retrieve the data and print it at that device. In contrast, when the data name and storage destination are stored in the data processing device, the data can only be retrieved at that device.

As another example, storage destination information of the data may be recorded beforehand in the portable memory medium, such that the data storage destination can be selected from the stored information. In this instance, a storage destination specifying operation is simple to perform when storing the data.

The storage means may be constructed to select the storage destination of the data based on information specified by the user. In this instance, when confidential data are stored, a user can store the data at a different location from an unrestricted storage destination by inputting information specifying himself, thus ensuring even greater data security.

Another aspect of the present invention is a data processing device connected to a network and an external memory device, and provided with a data information reading means for reading the data storage destination and data name stored on a portable memory medium; and a data reading means for reading corresponding data stored in the memory area of an external memory device based on the data storage destination and data name read by the data information reading means.

In this data processing device, fetching of data stored in an external memory device can be simply executed using a portable memory medium.

Yet another aspect of the present invention is a data processing device connected to a network and an external memory device, and provided with a storage means for storing data in the memory area of the external memory device; a data information recording means for storing on a portable memory medium the storage destination and data name in the memory area of data stored by the storage means; a data information reading means for reading the data storage destination and data name stored on the portable memory medium; and a data reading means for reading corresponding data stored in the memory area of an external memory device based on the data storage destination and data name read by the data information reading means.

According to this data processing device for storage of data in the external memory device, recording of the data name and storage destination in the portable memory medium, and reading of data from the external memory device using the portable memory medium are accomplished with a single device.

When storing data in an external memory device or reading data from an external memory device, it is desirable that management data are recorded in a predetermined memory area of the external memory device. According to this construction, usage conditions and the like of the external memory device can be easily managed over a network.

DESCRIPTION OF THE PREFERRED EMBODIMENTS

Figure 1:
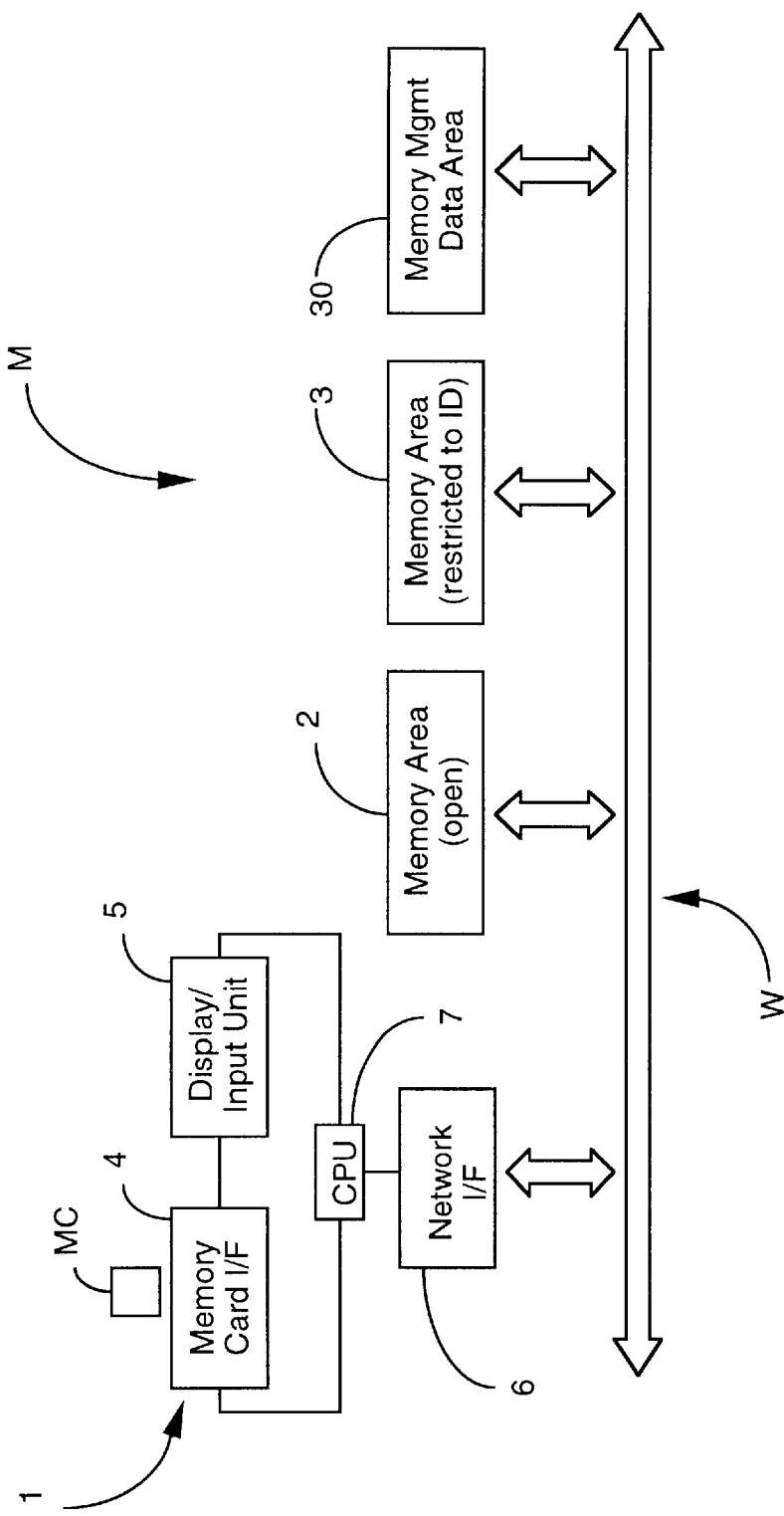
FIG. 1 is a structural diagram of a network including a digital copier as a first embodiment of the present invention.

The embodiments of the present invention are described hereinafter with reference to the accompanying drawings. FIG. 1 shows the structure of a network including a digital copier comprising a first embodiment of the present invention.

In FIG. 1, a digital copier 1 is connected by a network W with an external memory device M having memory areas 2, 3, and 30. The memory area 2 of the external memory device M is open and not restricted to recording, and the other memory area 3 is open for recording only when information specifying a user (hereinafter referred to as "ID") is input. The other memory area 30 is a management data memory area, and is used to record historical information when storing data in the external memory device M and when reading data from the external memory device M.

The digital copier 1 is provided with an interface (hereinafter referred to as "I/F") 4 for a portable memory medium, a display/input unit 5, a network connection I/F 6, and a CPU 7. Although not shown in the drawing, the copier 1 is also provided with a scanner for reading images, memory for temporary storage of scanned images, and printer for outputting images.

The portable memory medium I/F 4 functions as a data information recording/reading means for recording the file name and the storage destination of data stored on the external memory device onto a portable memory medium, e.g., a memory card MC, which can be carried by itself and can be removably installed in the copier 1, or conversely for reading data information from the memory card MC. This portable memory medium I/F 4 may also function to detect whether or not a portable memory medium is installed in the copier, and whether or not the memory card MC is normal.

The portable memory medium is not limited to a memory card inasmuch as a floppy disk, magneto-optical disk (MO) and the like may be used as the portable memory medium.

The display/input unit 5 has the functions of displaying the memory content and the like of the memory card MC, and inputting data file names, user ID and the like via a ten-key pad.

The network connection I/F 6 functions as a data storage/reading means for transferring and storing image data and the like to the external memory device M over the network W, and conversely reading data stored in the external memory device M into the copier 1.

The CPU 7 controls the entirety of the copier 1.

In the present embodiment, when a user ID is input when storing data to the external memory device M, a determination is made that the data are confidential and the data are stored in the specific memory area 3; when an ID is not input, the data are stored in the unrestricted memory area 2.

In the present embodiment, the data storage destination is recorded beforehand in the memory card MC. Therefore, because the information in the memory card can be displayed on the display/input unit 5 when the memory card MC is installed, the storage destination can be readily specified when storing data by simply selecting this displayed information.

Furthermore, a user ID may be stored on the memory card MC ahead of time so as to be automatically read and input by the memory card I/F 4. Of course, even if the storage destination and ID are not recorded beforehand on the memory card MC, a user may select/specify the storage destination on the display screen of the display/input unit 5, or the user may input an ID at this time using the ten-key pad.

The operation when storing image data read by a scanner (not shown in the drawing) in the digital copier 1 to the external memory device M is described hereinafter with reference to the flow chart of FIG. 2. In the drawings and description below, step is abbreviated as "S."

Figure 2:
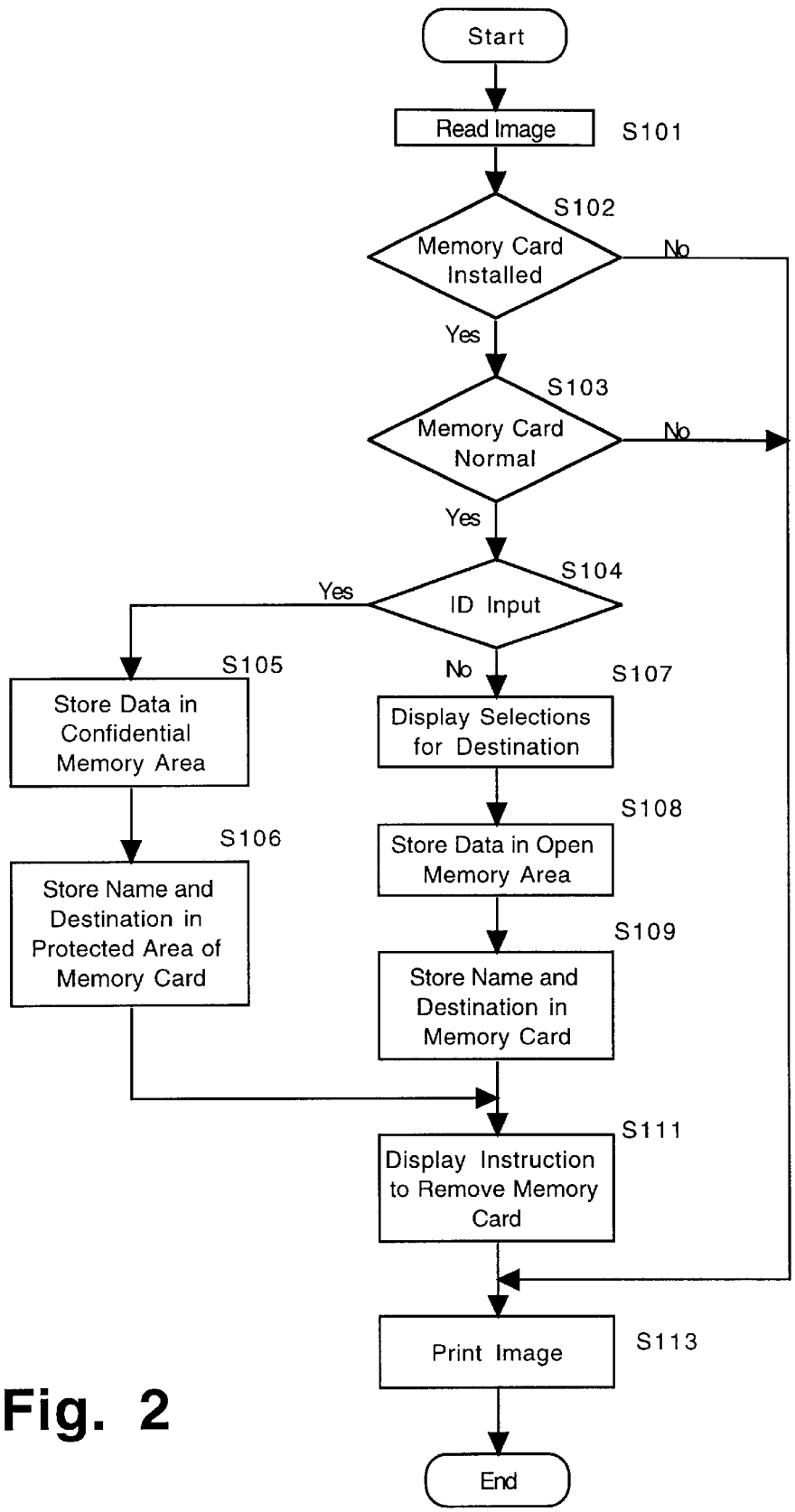
FIG. 2 is a flow chart showing the storage operation for storing data in a digital copier to an external memory device.

In FIG. 2, first, a document is set on the copier 1, and a memory card is installed at a predetermined location. In this state, the copier 1 reads the document image as data in S101, and in S102 a determination is made as to whether or not the memory card MC is installed in the copier 1, i.e., the memory card I/F 4 determines whether a memory card is present or absent. When a memory card MC is installed (S102: YES), in S103 the memory card I/F 4 determines whether or not the memory card MC is normal. If a memory card MC is not installed (S102: NO), the routine continues to S113, and a copy image is output by the printer in the same manner as a normal copy.

When the memory card MC is normal (S103: YES), in S104 a determination is made as to whether or not an ID has been input. When the memory card is not normal (S103: NO), the routine continues to S113, and a copy image is output.

When an ID has been input (S104: YES), in S105 the network I/F 6 transfer/stores data to the confidential storage memory area 3 among the two memory areas 2 and 3 of the external memory device, and in S106 the memory card I/F 4 stores the data file name and storage destination in the ID protected area of the memory card MC, and thereafter the routine continues to S111.

When an ID has not been input (S104: NO), in S107 a plurality of storage destinations recorded on the memory card are displayed on the display panel of the display/input unit 5 to allow selection of a storage destination. When the storage destination is fixed, this information need not be displayed. Similarly, when a selection sequence has been determined, this information need not be displayed since storage of the information in the top available storage area may be a prerequisite even if there are a plurality of storage destinations.

In S108 data are transferred and stored in the memory destination of the unrestricted memory area 2, and in S109 the data file name and storage destination are recorded on the memory card MC.

After instructions that the memory card MC may be removed have been displayed in S111, a copy image is printed in S113, and the routine ends.

In S113, whether or not to output a copy image may be selected. For example, data stored in the unrestricted memory area 2 may be output, and data stored in the confidential memory area 3 need not be output. When desiring to restrict the use of paper as much as possible, no data need be output.

In the present embodiment, when storing data to the external memory device M, a complex construction is unnecessary as when file names and the like are recorded and displayed on the digital copier 1 since the data file name and storage destination are recorded on the memory card MC, and a user can easily search optionally for data using the memory card MC. Moreover, when an ID is input, confidential data can be stored without fear of compromising confidentiality.

An embodiment is described below in terms of retrieving data stored on the external memory device M using the digital copier 1 of FIG. 1. In this embodiment, the network I/F 6 reads the corresponding data from the storage destination memory area 2 (3) based on the data storage destination information, and thereafter outputs these data from a printer not shown in the drawing. When data have been stored on the confidential protected memory area 3, such data are fetched from the memory area 3 by inputting a user ID.

In this embodiment, the data storage destination and the data file name are stored beforehand in the memory card MC, and if the memory card MC is installed in the copier 1, the storage destination and the file name can be displayed on the display/input unit 5 and selected. In this way, confidential data may be obtained by the user himself without being available to others.

The aforesaid information need not be displayed when there is only one type of file of the data to be read, or when the file name is self-evident.

The operation of reading data in the digital copier 1 is described below with reference to the flow chart of FIG. 3.

Figure 3:
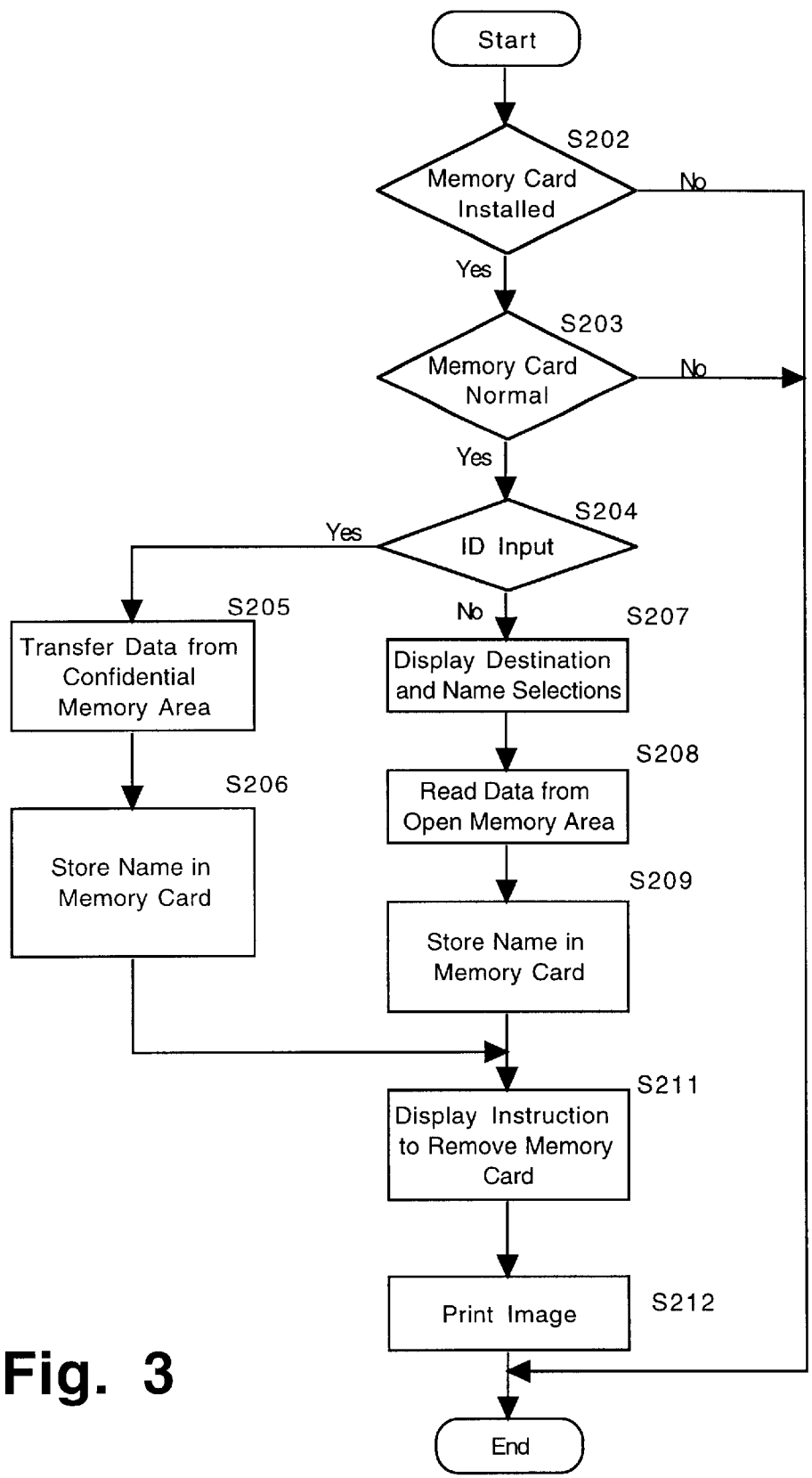
FIG. 3 is a flow chart showing the operation of reading data from an external memory device in a digital copier.

In FIG. 3, at S202 a determination is made as to whether or not a memory card MC is installed. When a memory card MC is installed (S202: YES), in S203 a check is made to determine whether or not the memory card MC is normal. When a memory card MC is not installed (S202: NO), the routine ends. When the installed memory card MC is normal (S203: YES), in S204 a check is made to determine whether or not an ID has been input. When the installed memory card MC is not normal (S203: NO), the routine ends.

When an ID has been input (S204: YES), in S205 the file is read from the confidential protected memory area 3 and transferred to the printer, and in S206 the file name of the data is recorded on the memory card MC, and thereafter the routine continues to S211.

When an ID has not been input (S204: NO), in S207 the storage destinations and file names stored on the memory card MC are displayed on the display/input unit 5 so as to allow selection. If the storage destination and file name are self-evident, they need not be displayed.

When a specific item is selected from among both the displayed storage destinations and file names, in S208 the corresponding data are read from the unrestricted memory area 2, and in S209 the file name is recorded on the memory card MC so the user will understand that the data have already been read from the memory area 2. Thereafter, in S211 instructions allowing retrieval from the memory card MC are displayed on the display/input unit 5, and then in S212 the read data are output as a copy image, then the routine ends.

In this embodiment, data readout can be simply executed using the memory card MC because data stored in the memory area are read based on the data storage destination and data file name recorded on the memory card MC.

The copier 1 described above and shown in FIG. 1 records historical information such as the ID recorded on the memory card MC, the ID input by a user, and the data name and the like in the management data memory area 30 when storing and reading data.

Figure 4:
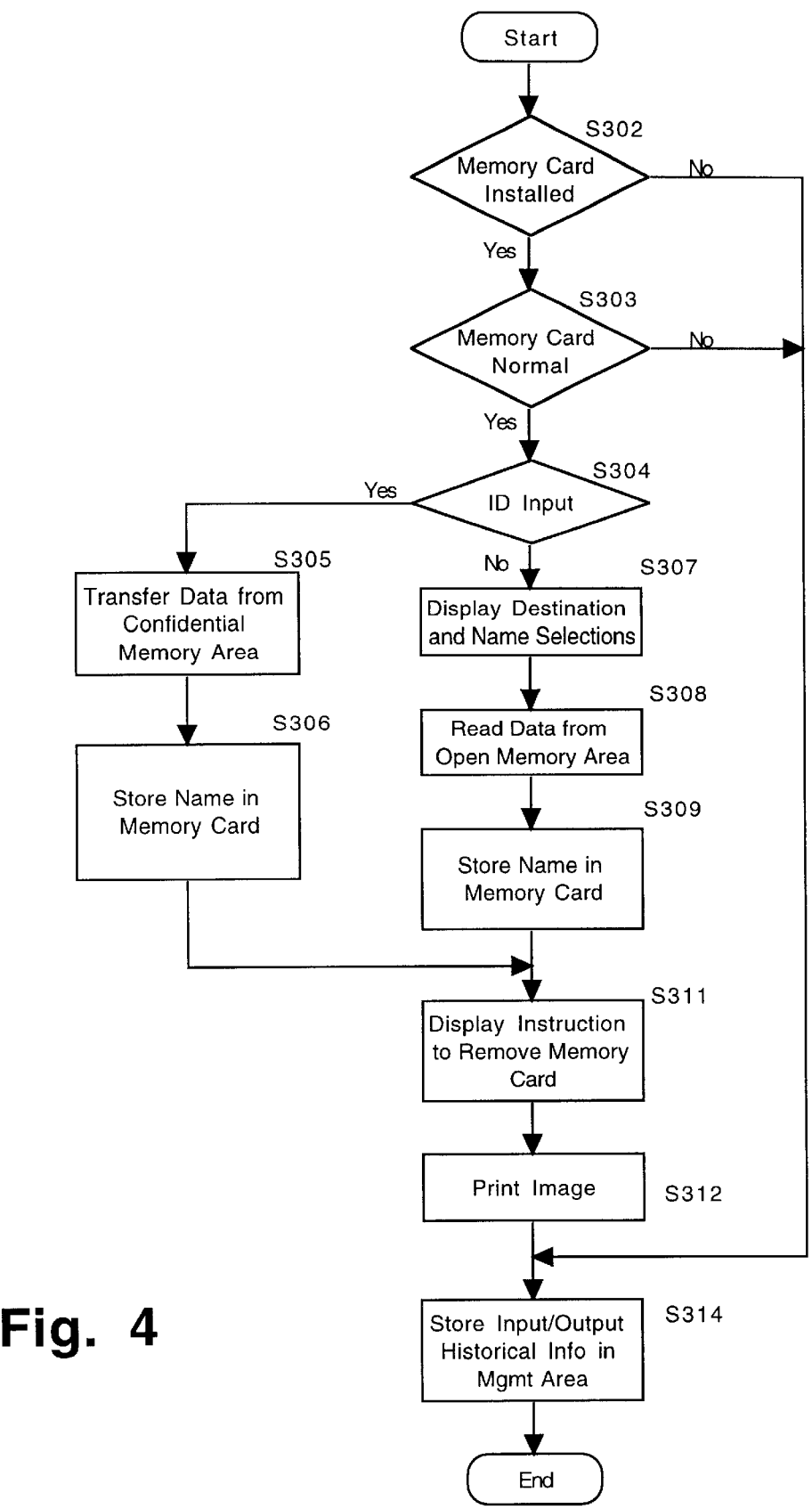
FIG. 4 is a flow chart showing an operation including data historical processing in a digital copier.

FIG. 4 is a flow chart showing the operation of recording historical information in the management data memory area 30.

In FIG. 4, first, in S302 a determination is made as to whether or not a memory card MC is installed. When a memory card MC has been installed (S302: YES), in S303 a check is made to determine whether or not the memory card MC is normal. When a memory card MC is not installed (S302: NO), the routine ends. When the memory card MC is normal (S303: YES), in S304 a determination is made as to whether or not an ID has been input. When the memory card MC is not normal (S303: NO), the routine ends.

When an ID has been input (S304: YES), in S305 the file is read from the confidential protected memory area 3 and transferred to the printer, and in S306 the file name is recorded on the memory card MC, and thereafter the routine continues to S311.

When an ID has not been input (S304: NO), in S307 the storage destinations and file names stored on the memory card MC are displayed on the display/input unit 5 for selection. This information need not be displayed if the storage destination and file name are self-evident.

When a specific item is selected from among the displayed storage destinations and file names, in S308 the corresponding data are read from the unrestricted memory area 2, and in S309 the read file name is recorded in the memory card MC. Thereafter, in S311, instructions allowing retrieval of the memory card MC are displayed on the display/input unit 5, and then in S312 the read data are output as a copy image.

Then, in S314 historical information are recorded in the management data memory area 30, and the routine ends.

Although the flow chart of FIG. 4 shows the operation when historical information are recorded in the management data memory area 30 when data have been read from the external memory device M, the historical information may be recorded in the management data memory area 30 after the copy image is output even when data are stored in the external memory device M as shown in the flow chart of FIG. 2.

In this embodiment, when data storage or readout is executed, a network manager can be rapidly and reliably alerted to the usage state of the external memory device M by recording the data historical information in the management data memory area 30 and alerting the manager.

The aforesaid embodiments have been described in terms of data being recorded in an external large-capacity memory device connected to a network. However, other constructions are possible. For example, the present invention may even be adapted to a construction which records data in an internal large-capacity memory device (hard disk and the like).

According to the present invention data of an input image or the like are transferred and stored in the memory area of an external memory device, and the data name and storage destination of the stored data can be recorded on a portable memory medium via a recording means, such that the data location can be simply and easily managed at the same time using this portable memory medium. Furthermore, since the data name and storage destination are recorded on the portable memory medium, there is less risk that persons other than the possessor of the portable memory medium will have access to these data names and storage destinations, thus ensuring data security compared to when such data are recorded in the data processing device. Moreover, since the data names and storage destinations need not be recorded in the data processing device, complex controls are not required to display the recorded data names on the display panel. In addition, the stored data can be accessed from any of a plurality of data processing devices that may be connected to the external memory device, rather than only the single device at which the data was input.

The aforesaid embodiments are data storage devices having excellent operability, wherein the storage destination information of data is stored beforehand in the portable memory medium, and since the data storage destination is selectable from this storage information, the storage destination specification operation is simply executed when transferring and storing data.

According to the aforesaid embodiments, since a storage means selects the data storage destination based on user specified information, when a user stores confidential data, he can store the data at a specific storage destination different from an unrestricted storage destination by entering information specifying himself, thus ensuring greater security of the data.

The aforesaid embodiments are data processing devices having excellent operability and capable of simply executing readout of data stored in an external memory device by using a portable memory medium.

According to the aforesaid embodiments, storage of data in an external memory device, recording of data name and storage destination in a portable memory medium, and reading of data from the external memory device using the portable memory medium are accomplished with a single device, and are extremely advantageous.

According to the aforesaid embodiments, when data are stored in an external memory device or data are read from an external storage device, a network manager can be easily alerted to the usage condition of the external memory device because historical information is recorded in a predetermined memory area of the external memory device.

What is claimed is:

1. A data processing device comprising:
   a data acquiring unit for capturing data;
   a memory unit for storing captured data;
   a slot for installing a portable memory medium; and
   a control unit for storing information specifying the storage position of data recorded within the memory unit on a portable memory medium installed in the slot.

2. The data processing device claimed in claim 1, wherein data storage destination information is stored beforehand in the portable memory medium, and the data storage position is selectable from this storage destination information.

3. The data processing device of claim 1, wherein said memory unit includes a first memory area with restricted access and a second memory area with unrestricted access, and wherein said control unit specifies a storage position in said first memory area or said second memory area in dependence upon whether or not a personal identification of a user is received.

4. The data processing device of claim 3, wherein said personal identification is stored on the portable memory medium.

5. The data processing device of claim 3, further including an input device via which a user can enter said personal identification.

6. A data processing device comprising:
   a data acquiring unit for capturing data;
   an output unit for outputting captured data;
   an external memory unit for storing captured data;
   a slot for installing a portable memory medium; and
   a control unit for storing information specifying the storage position of data recorded within the external memory unit on a portable memory medium installed in the slot.

7. The data processing device claimed in claim 6, wherein data storage destination information is stored beforehand in the portable memory medium, and the data storage position is selectable from this storage destination information.

8. The data processing device claimed in claim 6, wherein the control unit selects the data storage position based on the information specified by a user.

9. The data processing device of claim 6, wherein said external memory unit includes a first memory area with restricted access and a second memory area with unrestricted access, and wherein said control unit specifies a storage position in said first memory area or said second memory area in dependence upon whether or not a personal identification of a user is received.

10. The data processing device of claim 9, wherein said personal identification is stored on the portable memory medium.

11. The data processing device claimed in claim 6, wherein historical information is stored in a predetermined memory area of the external memory unit when data are stored in the external memory unit or data are read from the external memory unit.

12. A data processing device comprising:
   a data acquiring device for capturing data;
   an external memory device connected to the data acquiring device via a network for storing data captured by the data acquiring device;
   a slot provided on the data acquiring device for installing a portable memory medium; and
   a control unit for storing information specifying the storage position of data recorded within the external memory device on a portable memory medium installed in the slot.

13. A data reading device comprising:
   a reading unit for reading an image and capturing image data;
   an output unit for outputting captured image data to an external memory device;
   a slot for installing a portable memory medium; and a control unit for storing information specifying the storage position of data recorded within the external memory device on a portable memory medium installed in the slot.

14. A method for storing and accessing data, comprising the steps of:

acquiring data in a data processing device;

storing the data in a memory unit that is connected to said data processing device; and storing information, which identifies the storage location of said data in said memory unit, on a portable memory medium which is removable from said data processing device and is separate from said memory unit.

15. The method of claim 14, wherein said memory unit is external to said data processing device.

16. The method of claim 14 further including the steps of determining whether a user identification is received, storing said data in a first memory unit having restricted access when a user identification is received, and storing said data in a second memory unit having unrestricted access when a user identification is not received.

17. The method of claim 16, wherein said user identification is read from said portable memory medium.

18. The method of claim 16, wherein said user identification is manually entered by a user.

19. The method of claim 14, wherein more than one storage location are identified and stored on said portable memory medium, and further including the step of displaying the identified storage locations for selection of the destination at which said data is to be stored.

20. A method for retrieving and printing image data, comprising the steps of:

retrieving data from a portable memory medium installed in an image printing device which identifies the location of at least one image file that is stored on a memory unit connected to said image printing device;

reading at the image printing device an image file that is identified by the data retrieved from the portable memory medium; and printing an image from said image file.

21. The method of claim 20 wherein said memory unit is external to said image printing device.

22. The method of claim 20 wherein said portable memory medium contains an identification of plural image files and their respective storage locations, and further including the step of displaying an identification of said plural image files at said image printing device for selection by a user.

* * * * *